United States Patent [19]

Ayres et al.

[11] Patent Number: 5,678,912
[45] Date of Patent: Oct. 21, 1997

[54] THREE PIECE INSTRUMENT CLUSTER ASSEMBLY AND METHOD

[75] Inventors: John A. Ayres, Lapeer, Mich.; Michael E. Salmon, Madison, Ala.

[73] Assignee: Nu-Tech & Engineering, Inc., Lapeer, Mich.

[21] Appl. No.: 506,557

[22] Filed: Jul. 25, 1995

[51] Int. Cl.[6] .................................................. G01D 11/28
[52] U.S. Cl. .................................. 362/23; 362/28; 362/30
[58] Field of Search .............................. 362/23, 26, 28, 362/29, 30, 31; 248/27.1, 27.3

[56] References Cited

U.S. PATENT DOCUMENTS

| | | | |
|---|---|---|---|
| 3,053,337 | 9/1962 | Prohaska et al. | 362/23 |
| 4,447,860 | 5/1984 | Stone et al. | 362/23 |
| 5,257,167 | 10/1993 | Clem | 362/23 |
| 5,272,463 | 12/1993 | Furuya et al. | 362/23 |
| 5,406,303 | 4/1995 | Salmon et al. | 362/26 |

*Primary Examiner*—Ira S. Lazarus
*Assistant Examiner*—Alfred Basichas
*Attorney, Agent, or Firm*—Fildes & Outland, P.C.

[57] ABSTRACT

A three-piece instrument cluster assembly including a circuit board, a light sheet assembly and a retainer for retaining the circuit board and light sheet assembly. The light sheet assembly is positioned between the circuit board and retainer. The instrument cluster assembly is provided with at least one alignment element and corresponding alignment receivers for mating engagement with each corresponding alignment element for aligning the circuit board, the light sheet assembly and the retainer.

18 Claims, 3 Drawing Sheets

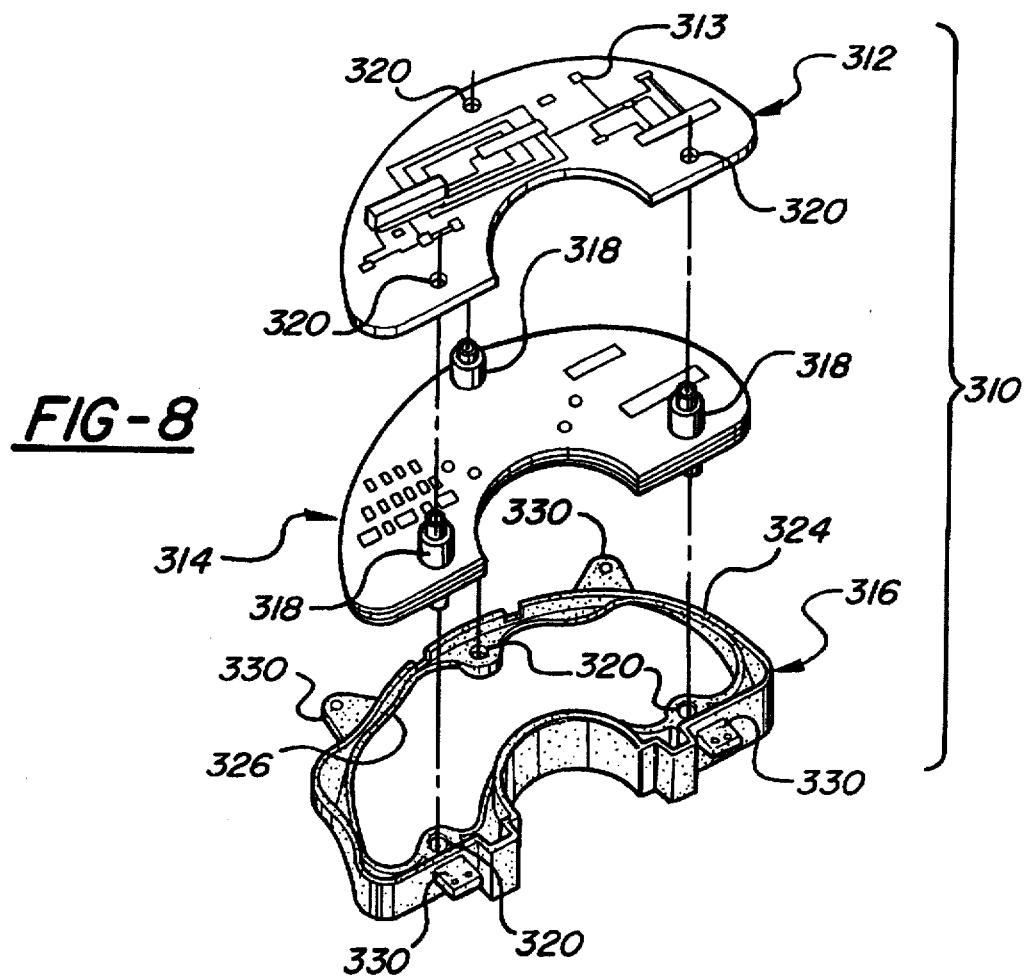
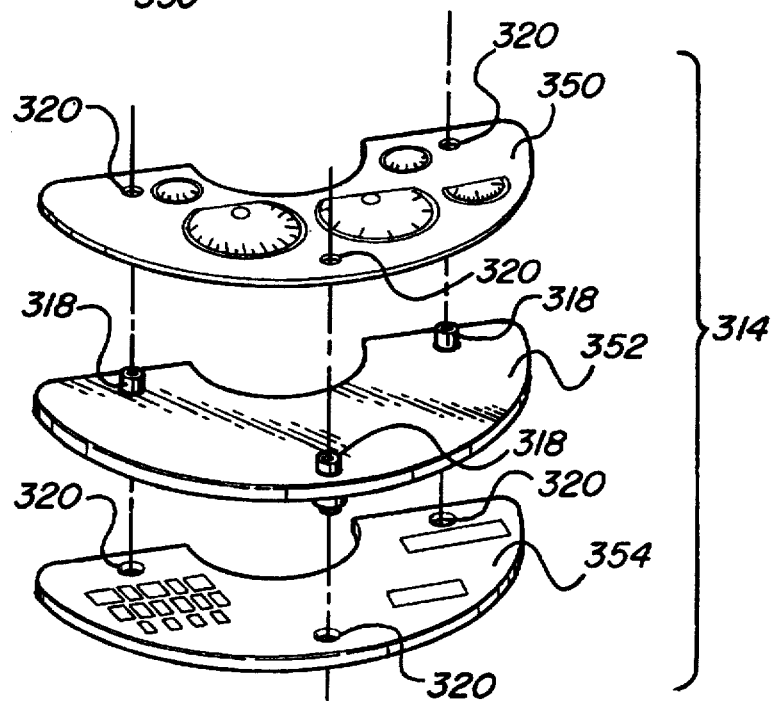

THREE PIECE INSTRUMENT CLUSTER ASSEMBLY AND METHOD

FIELD OF THE INVENTION

This invention relates to instrument cluster assemblies for mounting in vehicles to display information and, more particularly, to a low cost instrument cluster assembly and assembling method.

BACKGROUND OF THE INVENTION

Typical vehicle instrument cluster assemblies include four components or pieces mounted together: a circuit board, a case, a graphic display board and a styling member. The conventional circuit board includes a plurality of incandescent lamps. The case is mounted to the circuit board and includes a plurality of light boxes corresponding to the plurality of incandescent lamps for housing the lamps and diffusing the light emitted thereby through the graphic display board. The styling member is adapted to mount the graphic display board to the case. The circuit board, case, graphic display board and styling member each include mounting apertures. These mounting apertures must be aligned for receiving a plurality of bolts and nuts for fastening the components together. This alignment process adds to the amount of time and expense required for assembling the instrument cluster assembly.

SUMMARY OF THE INVENTION

The present invention provides a three-piece instrument cluster assembly wherein each piece includes either an alignment element or an alignment receiver for facilitating the alignment of the pieces upon assembly.

More specifically, the present invention provides an instrument cluster assembly including a circuit board, a light sheet assembly, and a retainer for retaining the circuit board and the light sheet assembly such that the light sheet assembly is positioned between the circuit board and the retainer.

The present invention also provides an instrument cluster assembly which includes at least one alignment element for aligning the circuit board, the light sheet assembly and the retainer, and an alignment receiver for mating engagement with each alignment element to thereby align the circuit board, the light sheet assembly and the retainer.

The present invention also provides an energy saving instrument cluster assembly which employs printed circuitry and light emitting diodes requiring less current for operation, as opposed to an instrument cluster assembly utilizing incandescent lamps.

The present invention also provides a method of assembling an instrument cluster assembly. The method includes the steps of: providing a retainer, a circuit board and a light sheet assembly; providing at least one alignment element and a corresponding alignment receiver for mating engagement with each corresponding alignment element; positioning the light sheet assembly between the circuit board and the retainer; and mating the elements and the receivers to align the light sheet assembly, the circuit board and the retainer.

These and other features and advantages of the invention will be more fully understood from the following detailed description of the invention taken together with the accompanying drawings.

BRIEF DESCRIPTION OF THE DRAWINGS

In the drawings:

FIG. 8 is an exploded perspective view of another embodiment of instrument cluster assembly according to the invention; and FIG. 9 is a perspective view of a light sheet assembly of an instrument cluster assembly according to the invention.

DETAILED DESCRIPTION OF THE INVENTION

Figure 1:
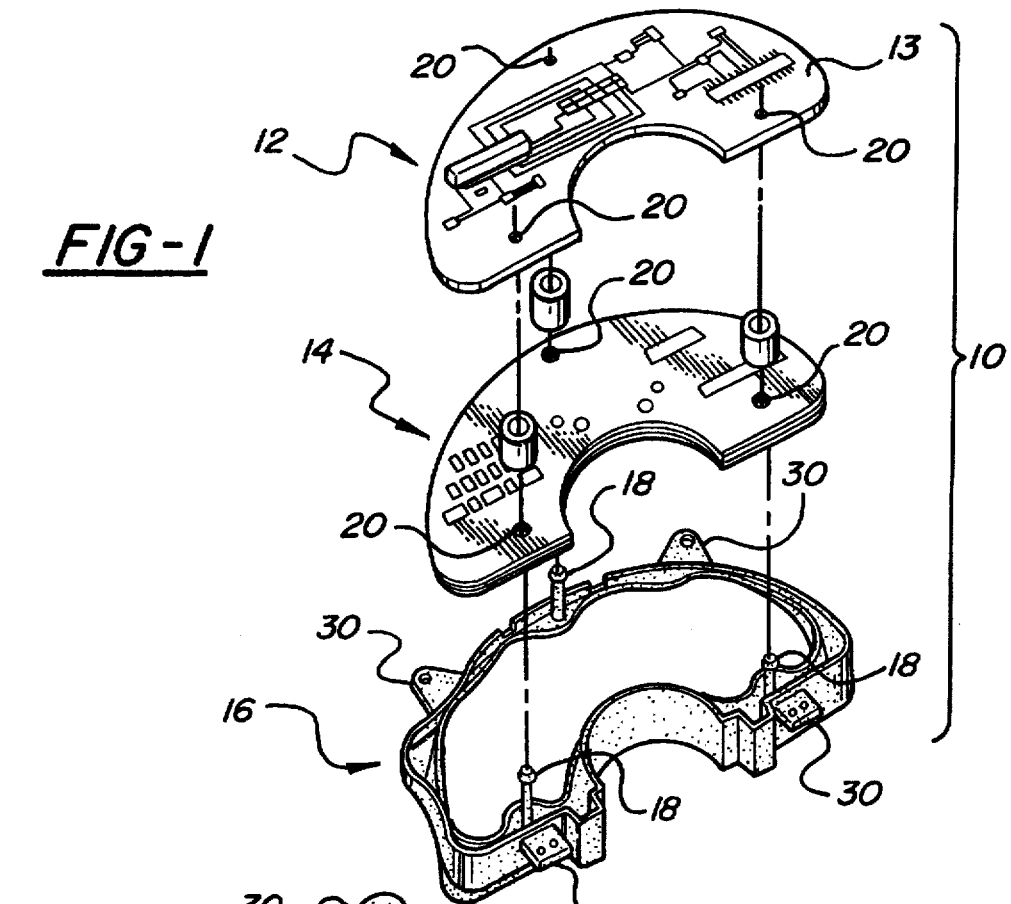
FIG. 1 is an exploded perspective view of an instrument cluster assembly according to the invention.

Referring now to FIGS. 1–4 of the drawings in detail, numeral 10 generally indicates a three-piece instrument cluster assembly including a circuit board assembly 12, hereinafter circuit board, a light sheet assembly 14 and a retainer 16 for retaining the circuit board 12 and the light sheet assembly 14. Light sheet assembly 14 is positioned between circuit board 12 and retainer 16. Circuit board 12 includes a substrate 13 The substrate 13 may be constructed of a light absorbing material or coated with a light absorbing material. Light sheet assembly 14 and retainer 16 can also be constructed of or coated with a light absorbing material.

Instrument cluster assembly 10 includes a plurality of alignment elements 18 for aligning circuit board 12, light sheet assembly 14 and retainer 16. Instrument cluster assembly 10 further includes alignment receivers 20 in the form of apertures for mating engagement with each alignment element 18 for aligning circuit board 12, light sheet assembly 14 and retainer 16. Preferably, and as shown in FIG. 1, alignment elements 18 are hollow posts projecting upwardly from retainer 16. Circuit board 12 and light sheet assembly 14 include a corresponding number of apertures acting as alignment receivers 20.

Figure 2:
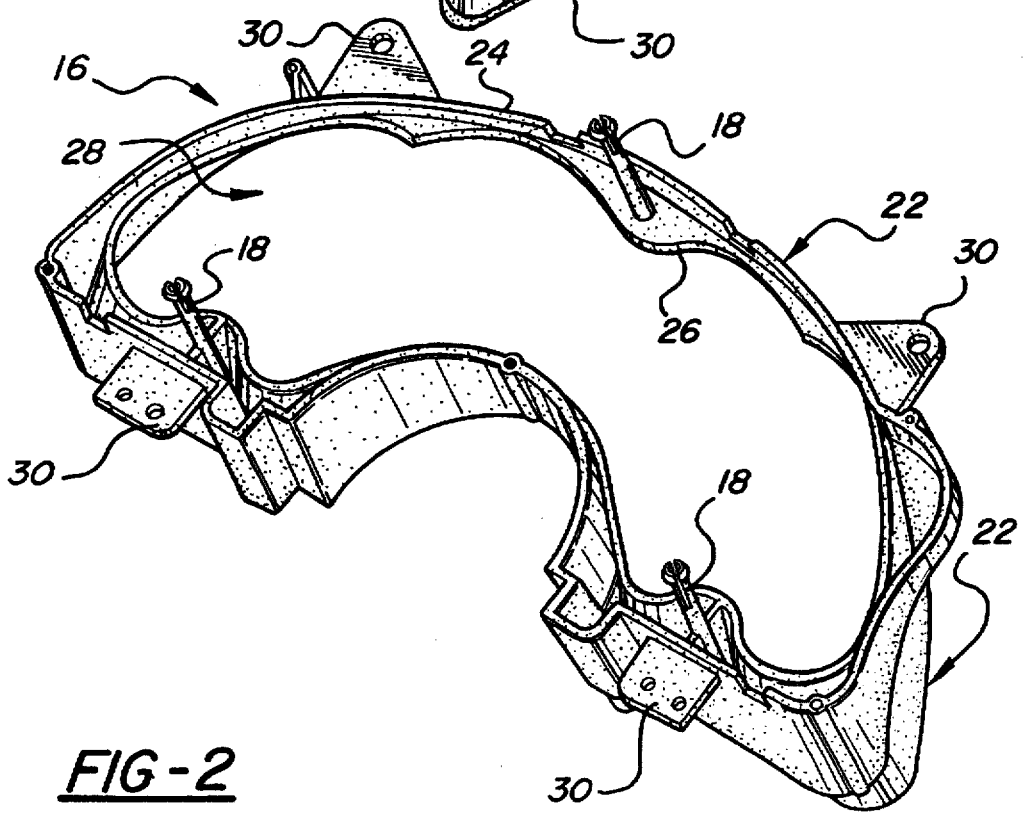
FIG. 2 is a rear perspective view of the retainer of the FIG. 1 instrument cluster assembly.

As seen in FIG. 2, retainer 16 includes a housing 22 having a side wall 24 and a flange 26 extending inwardly from the side wall 24 and defining a display opening 28. Side wall 24 and light sheet assembly 14 are adapted for nesting engagement so that light sheet assembly 14 nests within the side wall 24 and in engagement with flange 26 when instrument cluster assembly 10 is assembled. In this manner, side wall 24 may be used as an additional or alternative alignment element 18 for aligning light sheet assembly 14 and retainer 16. Circuit board 12 is adapted to mount upon and follow the outer contour of side wall 24.

Retainer 16 further includes a plurality of vehicle mounting tabs 30 for mounting retainer 16 to an instrument panel in a vehicle (not shown). Vehicle mounting tabs 30 extend outwardly from side wall 24. Instrument cluster assembly 10 further includes instrument pointers and covering lens, not shown, which are applied after assembly of the circuit board, light sheet assembly and retainer members.

Figure 3:
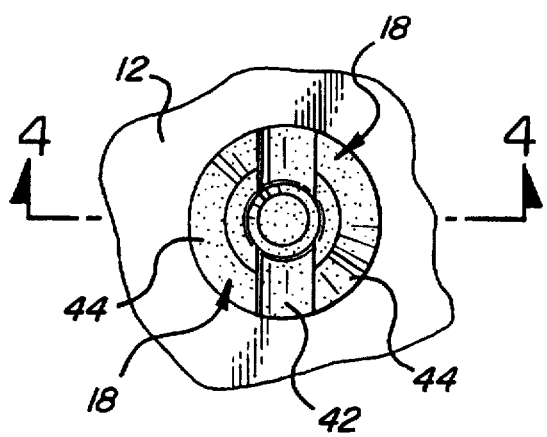
FIG. 3 is a fragmentary rear view of an instrument cluster assembly including an alignment element and an alignment receiver according to the invention.
Figure 4:
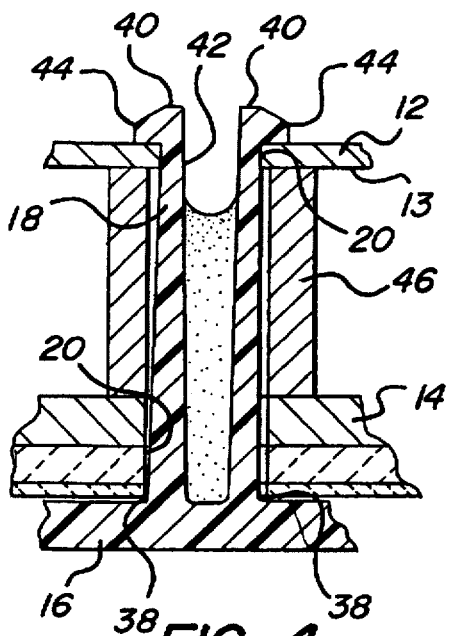
FIG. 4 is a cross-sectional view from line of FIG. 3.

Referring now to FIGS. 3 and 4, alignment elements or cylindrically-shaped retainer posts 18 are integrally formed with retainer 16 at a first end 38 and project outwardly from retainer 16 to an outer end 40. End 40 is slotted at 42 and includes dual oppositely extending lateral flanged portions 44 for snap-fit engagement with circular alignment receiver apertures 20. Tubular spacers 46 are positioned on the posts 18 between circuit board 12 and light sheet assembly 14 for maintaining a spacing between them. Preferably, spacers 46 are constructed of a rigid material. In this manner, the flanged portion 44 of each post 18 is retained in engagement with the assembled circuit board 12.

Figure 5:
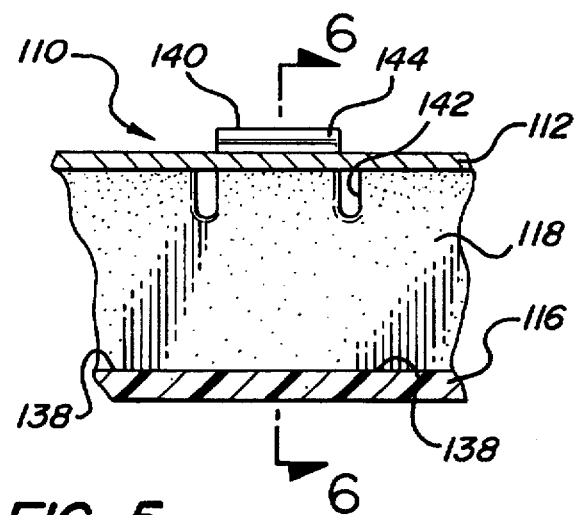
FIG. 5 is a fragmentary side view of an instrument cluster assembly employing an alternative embodiment of alignment element and alignment receiver according to the invention.
Figure 6:
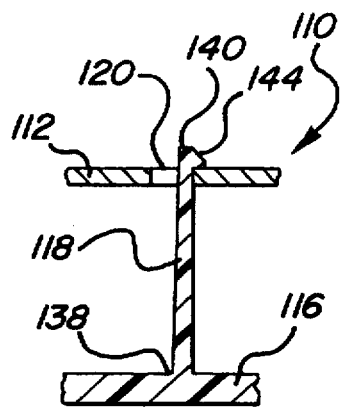
FIG. 6 is a cross-sectional view from line 6—6 of FIG. 5.

FIGS. 5 and 6 illustrate another embodiment of instrument cluster assembly according to the invention and generally indicated by numeral 110. Instrument cluster assembly 110 is generally similar to cluster assembly 10 except for the configuration and construction of alignment elements and alignment receivers. Each alignment element 118 is formed by a planar retainer post having a single lateral flange portion instead of a cylindrically-shaped retainer post with dual flange portions as in FIGS. 1-4. Each alignment receiver 120 is a rectangularly-shaped slot instead of a circular aperture. Each flanged portion 144 snaps into engagement with a circuit board 112 through its corresponding slot 120.

Figure 7:
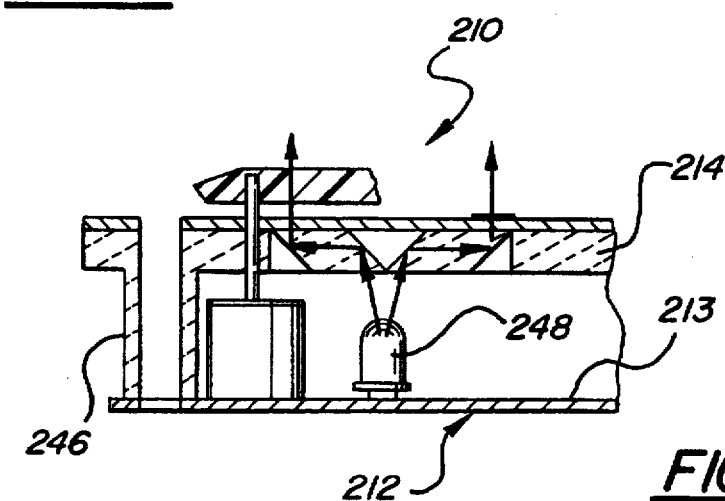
FIG. 7 is a cross-sectional view of an alternative embodiment of instrument cluster assembly according to the invention.

FIG. 7 illustrates another embodiment of instrument cluster assembly according to the invention and generally indicated by numeral 210. Cluster assembly 210 is generally similar to the previously described embodiments but differs in that spacers 246 are formed integrally with a light sheet assembly 214. FIG. 7 also shows a circuit board 212 which includes at least one light source 248 for providing illumination. Light source 248 is preferably a light emitting diode (LED). This light source arrangement is applicable to any of the instrument cluster embodiments herein described.

Referring now to FIG. 8, there is shown another alternative embodiment of an instrument cluster assembly according to the invention and generally indicated by the numeral 310. Assembly 310 is, again, generally similar to the previously described instrument cluster assemblies 10, 110, 210. However, the alignment elements 318 are located on light sheet assembly 314 and alignment receivers 320 are located on retainer 316 and circuit board 312.

In FIG. 9, the component parts of light sheet assembly 314 are shown to include a graphic display 350, a light sheet 352 and a light absorbing gasket 354. Alignment elements 318 are positioned on light sheet 352. Graphic display 350 and light absorbing gasket 354 include alignment receivers 320 for mating engagement with alignment elements 318 of light sheet 352 to align the three parts. In assembly, light sheet 352 is positioned between graphic display 350 and light absorbing gasket 354.

The present invention also includes a method of assembling an instrument cluster assembly 310 including a retainer 316, a circuit board 312 and a light sheet assembly 314 comprised of a graphic display 350, a light sheet 352 and a light absorbing gasket 354. The method of assembly includes the steps of providing at least one alignment element 318 and corresponding alignment receiver 320 for mating engagement with each corresponding alignment element 318 for aligning light sheet assembly 314, circuit board 312 and retainer 316. The light sheet assembly 314 is assembled by mating elements 318 and receivers 320 to align a graphic display 350, light sheet 352 and light absorbing gasket 354 such that the light sheet 352 is positioned between the graphic display 350 and the light absorbing gasket 354. After assembly, light sheet assembly 314 is positioned between circuit board 312 and retainer 316 with elements 318 and receivers 320 mated to align light sheet assembly 318, circuit board 312 and retainer 316. Circuit board 312 is then mounted to retainer 316 with light sheet assembly 318 sandwiched therebetween.

The method of the present invention also includes a step of providing each alignment element 318 with a longitudinal extending aperture for receiving an assembly screw. Optionally, the method of the present invention further includes the step of providing a spacer formed integrally with light sheet assembly 314 for spacing circuit board 312 and light sheet assembly 314.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A method of assembling an instrument cluster assembly, said method characterized by the steps of:
   providing a retainer, a circuit board and a light sheet assembly;
   providing at least one alignment element being a post having a resilient end and a corresponding alignment receiver being an aperture for mating engagement with each corresponding alignment element;
   positioning the light sheet assembly between the circuit board and the retainer; and
   mating the elements and the receivers to align the light sheet assembly, the circuit board and the retainer.

2. The method as in claim 1 characterized in that the step of providing a light sheet assembly includes assembling a graphic display, a light sheet, and a light absorbing gasket.

3. The method as in claim 1 further characterized by providing each alignment element with a longitudinally extending aperture for receiving an assembly screw.

4. The method as in claim 1 characterized by mounting the circuit board to the retainer.

5. The method as in claim 1 further characterized by providing a spacer for spacing the circuit board and the light sheet assembly.

6. The method as in claim 5 further characterized by forming the spacer integrally with the light sheet assembly.

7. The method as in claim 1 characterized in that the step of providing a retainer includes providing the retainer with a side wall and an inwardly extending flange.

8. The method as in claim 7 characterized by nesting the light sheet assembly within the sidewall on said flange.

9. An instrument cluster assembly characterized by:
   a circuit board;
   a light sheet assembly;
   a retainer for retaining said circuit board and said light sheet assembly such that said light sheet assembly is positioned between said circuit board and said retainer
   at least one alignment element for aligning said circuit board, said light sheet assembly, and said retainer; and
   an alignment receiver for mating engagement with each said alignment element to thereby align said circuit board, said light sheet assembly, and said retainer;
   said alignment element being a post having a resilient end; and said alignment receiver being an aperture for snap fitting engagement with said resilient end.

10. The instrument cluster assembly as in claim 9 characterized in that said retainer includes:

a housing including a sidewall, and a flange extending inwardly from said sidewall and defining a display opening.

11. An instrument cluster assembly characterized by:

a circuit board;

a light sheet assembly comprising;

a graphic display;

a light absorbing gasket; and a light sheet positioned between said graphic display and said light absorbing gasket;

a retainer for retaining said circuit board and said light sheet assembly such that said light sheet assembly is positioned between said circuit board and said retainer;

said circuit board including a substrate of a light absorbing construction; and a spacer for spacing said circuit board and said light sheet assembly.

12. The instrument cluster assembly as in claim 11 characterized in that said spacer is formed integrally with said light sheet assembly.

13. An instrument cluster assembly characterized by:

a circuit board;

a light sheet assembly comprising;

a graphic display;

a light absorbing gasket; and a light sheet positioned between said graphic display and said light absorbing gasket;

a retainer for retaining said circuit board and said light sheet assembly such that said light sheet assembly is positioned between said circuit board and said retainer;

said circuit board including a Substrate of a light absorbing construction;

at least one alignment element for aligning said circuit board, said light sheet assembly, and said retainer;

an alignment receiver for mating engagement with each said alignment element to thereby align said circuit board, said light sheet assembly, and said retainer;

said alignment element being a post having a resilient end; and said alignment receiver being an aperture for snap fitting engagement with said resilient end.

14. The instrument cluster assembly as in claim 13 characterized in that said retainer is of a light absorbing construction.

15. The instrument cluster assembly as in claim 13 characterized in that said retainer includes:

a housing including a sidewall, and a flange extending inwardly from said sidewall and defining a display opening.

16. The instrument cluster assembly as in claim 15 characterized in that said light sheet assembly is nested within said sidewall on said flange when assembled.

17. The instrument cluster assembly as in claim 15 characterized in that said retainer further includes a plurality of vehicle mounting tabs for mounting said instrument cluster assembly in a vehicle.

18. The instrument cluster assembly as in claim 17 characterized in that said vehicle mounting tabs extend outwardly from said sidewall.

* * * * *